United States Patent
Kent

(10) Patent No.: US 12,306,776 B1
(45) Date of Patent: May 20, 2025

(54) SINGLE-STAGE MERGE SORTING METHOD AND APPARATUS

(71) Applicant: Robert Bernard Kent, Albuquerque, NM (US)

(72) Inventor: Robert Bernard Kent, Albuquerque, NM (US)

( * ) Notice: Subject to any disclaimer, the term of this patent is extended or adjusted under 35 U.S.C. 154(b) by 0 days.

(21) Appl. No.: 18/642,587

(22) Filed: Apr. 22, 2024

(51) Int. Cl.
G06F 13/20 (2006.01)
G06F 7/16 (2006.01)

(52) U.S. Cl.
CPC ............... *G06F 13/20* (2013.01); *G06F 7/16* (2013.01)

(58) Field of Classification Search
CPC .................................. H04Q 1/00; H04Q 3/04
See application file for complete search history.

(56) References Cited

U.S. PATENT DOCUMENTS

| | | | |
|---|---|---|---|
| 3,418,632 A | 12/1968 | Batcher | |
| 3,428,946 A | 2/1969 | Batcher | |
| 4,922,246 A * | 5/1990 | Cormen | H04Q 3/521 326/97 |
| 5,216,420 A | 6/1993 | Munter | |
| 7,281,009 B2 | 10/2007 | Adas et al. | |
| 10,523,596 B1 | 12/2019 | Ferger et al. | |
| 11,360,740 B1 | 6/2022 | Kent et al. | |
| 11,693,623 B1 | 7/2023 | Kent et al. | |
| 11,803,509 B1 * | 10/2023 | Nie | G06F 15/8061 |
| 12,093,663 B1 | 9/2024 | Kent et al. | |
| 2013/0339903 A1 | 12/2013 | Cheng et al. | |
| 2014/0164402 A1 | 6/2014 | Haws et al. | |
| 2015/0195375 A1 | 7/2015 | Danziger et al. | |
| 2015/0347592 A1 | 12/2015 | Buyuktosunoglu et al. | |
| 2017/0168827 A1 | 6/2017 | Mishra et al. | |
| 2017/0308578 A1 | 10/2017 | Chen et al. | |
| 2018/0294610 A1 * | 10/2018 | Lewis | H01R 27/02 |
| 2019/0174206 A1 * | 6/2019 | Anolik | H04Q 1/00 |
| 2019/0273347 A1 * | 9/2019 | Stikeleather | H01R 13/50 |
| 2020/0124670 A1 * | 4/2020 | Dux | G01R 31/31721 |
| 2022/0057590 A1 * | 2/2022 | Crawford | G02B 6/562 |
| 2022/0206746 A1 * | 6/2022 | Kamiya | G06F 7/76 |

OTHER PUBLICATIONS

Batcher, K. E., "Sorting networks and their applications", Spring Joint Computer Conference, 1968, 307-314.

(Continued)

*Primary Examiner* — Getente A Yimer
(74) *Attorney, Agent, or Firm* — Peacock Law P.C.; Justin R. Jackson; Janeen Vilven

(57) ABSTRACT

A method and apparatus for performing single-stage merge sorting of at least two pre-sorted input lists. The method and apparatus can provide a stable merge such that a value in an input list with a higher stable property will precede an equal value in another input list with a lower stable property when mapped into the single sorted output list. The method and apparatus preferably perform the merge sorting in a set of single-stage operations and are most preferably implemented in asynchronous combinatorial logic, which uses no internal clocking—although synchronously clocked operations can be used and will provide desirable results.

19 Claims, 11 Drawing Sheets

```
UP/DN input lists: 2-way UP-2/DN-2 merge example.

1 --  In_3   In_2  -- UP sorted list with 2 values; In_3 max, In_2 min
0 --  In_1   In_0  -- DN sorted list with 2 values; In_1 max, In_0 min 1 --  5_up   1_up  -- UP sorted list with 2 values; Numeric example
0 --  5_dn   2_dn  -- DN sorted list with 2 values; Numeric example
```

(56) References Cited

OTHER PUBLICATIONS

Kent, Robert B., et al., "Design of High-Speed Multiway Merge Sorting Networks Using Fast Single-Stage N-Sorters and N-Filters", IEEE Access, vol. 10, 2022, 77980-77992.

Kent, Robert B., et al., "Design, Implementation, and Analysis of High-Speed Single-Stage N-Sorters and N-Filters", IEEE Access, vol. 9, 2021, 2576-2591.

Kent, Robert B., et al., "Use of Carry Chain Logic and Design System Extensions to Construct Significantly Faster and Larger Single-Stage N-Sorters and N-Filters", IEEE Access, vol. 10, 2022, 79689-79702.

Norollah, Amin, et al., "RTHS: A Low-Cost High-Performance Real-Time Hardware Sorter, Using a Multidimensional Sorting Algorithm", IEEE Transactions on Very Large Scale Integration (VLSI) Systems, vol. 27, No. 7, 2019, 1601-1613.

Cormen, et al., "A hyperconcentrator switch for routing bit-serial messages", Journal of Parallel and Distributed Computing, vol. 10, Issue 3, 1990, 193-204.

Cormen, et al., "Introduction to Algorithms, 1st Edition, Chapter 28: Sorting Networks", The MIT Press, ISBN: 9780262530910, 1990, 634-650.

* cited by examiner

```
UP/DN input lists: 2-way UP-2/DN-2 merge example.

1 --  In_3   In_2  -- UP sorted list with 2 values; In_3 max, In_2 min
0 --  In_1   In_0  -- DN sorted list with 2 values; In_1 max, In_0 min 1 --  5_up   1_up  -- UP sorted list with 2 values; Numeric example
0 --  5_dn   2_dn  -- DN sorted list with 2 values; Numeric example
```

The 6 ordered output lists for the 2-way UP-2/DN-2 merge, grouped by Out_3/Out_2 inputs.

| Out_3 | Out_2 | Out_1 | Out_0 | ge_3_1 | ge_3_0 | ge_2_1 | ge_2_0 | |
|---|---|---|---|---|---|---|---|---|
| In_3 | In_2 | In_1 | In_0 | 1 | 1 | 1 | 1 | |
| In_3 | In_1 | In_2 | In_0 | 1 | 1 | . | 1 | |
| In_3 | In_1 | In_0 | In_2 | 1 | 1 | . | . | <= Example |
| In_1 | In_3 | In_2 | In_0 | . | 1 | . | 1 | |
| In_1 | In_3 | In_0 | In_2 | . | 1 | . | . | |
| In_1 | In_0 | In_3 | In_2 | . | . | . | . | |
| 1 | 2 | 2 | 1 | $N_{POSS\_UP}$ | | | | |
| 1 | 2 | 2 | 1 | $N_{POSS\_DN}$ | | | | |
| 2 | 4 | 4 | 2 | $N_{POSSIBLE}$ | | | | |

FIG. 3A

The 6 ordered output lists for the 2-way UP-2/DN-2 merge, grouped by Out_1/Out_0 inputs.

| Out_3 | Out_2 | Out_1 | Out_0 | ge_3_1 | ge_3_0 | ge_2_1 | ge_2_0 | |
|---|---|---|---|---|---|---|---|---|
| In_3 | In_2 | In_1 | In_0 | 1 | 1 | 1 | 1 | |
| In_3 | In_1 | In_2 | In_0 | 1 | 1 | . | 1 | |
| In_1 | In_3 | In_2 | In_0 | . | 1 | . | 1 | |
| In_3 | In_1 | In_0 | In_2 | 1 | 1 | . | . | <= Example |
| In_1 | In_3 | In_0 | In_2 | . | 1 | . | . | |
| In_1 | In_0 | In_3 | In_2 | . | . | . | . | |
| 1 | 2 | 2 | 1 | $N_{POSS\_UP}$ | | | | |
| 1 | 2 | 2 | 1 | $N_{POSS\_DN}$ | | | | |
| 2 | 4 | 4 | 2 | $N_{POSSIBLE}$ | | | | |

FIG. 3B

```
The 4 2-way UP-2/DN-2 merge output port equations:

Out_3 = ge_3_1 ?                        In_3 : In_1 ;        In_3 : 5_up

Out_2 = ge_3_1 ? ( ge_2_1 ? In_2 : In_1 )                    In_1 : 5_dn
              : ( ge_3_0 ? In_3 : In_0 ) ;

Out_1 = ge_2_0 ? ( ge_2_1 ? In_1 : In_2 )
              : ( ge_3_0 ? In_0 : In_3 ) ;                   In_0 : 2_dn

Out_0 = ge_2_0 ?                        In_0 : In_2 ;        In_2 : 1_up
```

FIG. 4

Inputs per Output : 2-way UP-2/DN-2 Merge

| Input | Out_3 | Out_2 | Out_1 | Out_0 |
|---|---|---|---|---|
| In_3 | X | X | X |   |
| In_2 |   | X | X | X |
| In_1 | X | X | X |   |
| In_0 |   | X | X | X |

FIG. 5

Select Lines per Output : 2-way UP-2/DN-2 Merge

| Select | Out_3 | Out_2 | Out_1 | Out_0 |
|---|---|---|---|---|
| ge_3_1 | X | X |   |   |
| ge_3_0 |   | X | X |   |
| ge_2_1 |   | X | X |   |
| ge_2_0 |   |   | X | X |

FIG. 6

```
UP/DN output lists: 2-way UP-2/DN-2 merge example.

1 -- Out_3 Out_2 -- UP output list; Out_3 overall max, Out_2 >= Out_1
0 -- Out_1 Out_0 -- DN output list; Out_1 DN max, Out_0 overall min Out_3 Out_2 Out_1 Out_0 -- Left-to-right 1-D descending sorted order 5_up  5_dn  2_dn  1_up -- Numeric example
 In_3  In_1  In_0  In_2 -- Numeric example
```

FIG. 7

```
2-way UP-2/DN-2 merge example: possible inputs for the 4 outputs

Out_3        -- Out_3 , 1st_HI max UP output ; ge_3_1 top select
~~~~~~~~~~~~~~~~~~~~~~~~~~~~~~~~~~~~~~~~~~~~~~~~~~~~~~~~~~~~~~~~~~~~~
1 --   In_3         -- UP input list ; Only In_3 can go to 1st_HI, Out_3
0 --   In_1         -- DN input list ; Only In_1 can go to 1st_HI, Out_3
~~~~~~~~~~~~~~~~~~~~~~~~~~~~~~~~~~~~~~~~~~~~~~~~~~~~~~~~~~~~~~~~~~~~~
         Out_2 -- Out_2 is the 2nd_HI UP output ; ge_3_1 top select
~~~~~~~~~~~~~~~~~~~~~~~~~~~~~~~~~~~~~~~~~~~~~~~~~~~~~~~~~~~~~~~~~~~~~
1 --   In_3  In_2 -- UP input list ; Both UP inputs can go to Out_2
0 --   In_1  In_0 -- DN input list ; Both DN inputs can go to Out_2
~~~~~~~~~~~~~~~~~~~~~~~~~~~~~~~~~~~~~~~~~~~~~~~~~~~~~~~~~~~~~~~~~~~~~

~~~~~~~~~~~~~~~~~~~~~~~~~~~~~~~~~~~~~~~~~~~~~~~~~~~~~~~~~~~~~~~~~~~~~
1 --   In_3  In_2 -- UP input list ; Both UP inputs can go to Out_1
0 --   In_1  In_0 -- DN input list ; Both DN inputs can go to Out_1
~~~~~~~~~~~~~~~~~~~~~~~~~~~~~~~~~~~~~~~~~~~~~~~~~~~~~~~~~~~~~~~~~~~~~
       Out_1        -- Out_1 is the 2nd_LO DN output ; ge_2_0 top select
~~~~~~~~~~~~~~~~~~~~~~~~~~~~~~~~~~~~~~~~~~~~~~~~~~~~~~~~~~~~~~~~~~~~~
1 --         In_2 -- UP input list ; Only In_2 can go to 1st_LO, Out_0
0 --         In_0 -- DN input list ; Only In_0 can go to 1st_LO, Out_0
~~~~~~~~~~~~~~~~~~~~~~~~~~~~~~~~~~~~~~~~~~~~~~~~~~~~~~~~~~~~~~~~~~~~~
          Out_0 -- Out_0 , 1st_LO min DN output ; ge_2_0 top select
```

FIG. 8

```
UP/DN output lists: 2-way UP-1/DN-3 merge example.

1 --  In_3                  -- UP inputs; In_3 max and min
0 --  In_2  In_1  In_0      -- DN inputs; In_2 DN max, In_0 DN min 1 --  2_up                  -- UP sorted input list ; Numeric example
0 --  5_dn  4_dn  2_dn      -- DN sorted input list ; Numeric example Out_3 Out_2 Out_1 Out_0     -- Left-to-right 1-D descending sorted order 5_dn  4_dn  2_up  2_dn     -- Numeric example
 In_2  In_1  In_3  In_0     -- Numeric example
```

FIG. 9

The 4 ordered output lists for the 2-way UP-1/DN-3 merge.

| Out_3 | Out_2 | Out_1 | Out_0 | ge_3_2 | ge_3_1 | ge_3_0 |
|-------|-------|-------|-------|--------|--------|--------|
| In_3  | In_2  | In_1  | In_0  | 1      | 1      | 1      |
| In_2  | In_3  | In_1  | In_0  | .      | 1      | 1      |
| In_2  | In_1  | In_3  | In_0  | .      | .      | 1      | <= Example
| In_2  | In_1  | In_0  | In_3  | .      | .      | .      |
| 1     | 1     | 1     | 1     | $N_{POSS\_UP}$ | | |
| 1     | 2     | 2     | 1     | $N_{POSS\_DN}$ | | |
| 2     | 3     | 3     | 2     | $N_{POSSIBLE}$ | | |

FIG. 10

Inputs per Output : 2-way UP-1/DN-3 Merge

| Input | Out_3 | Out_2 | Out_1 | Out_0 |
|-------|-------|-------|-------|-------|
| In_3  | X     | X     | X     | X     |
| In_2  | X     | X     |       |       |
| In_1  |       | X     | X     |       |
| In_0  |       |       | X     | X     |

FIG. 11

Select Lines per Output : 2-way UP-1/DN-3 Merge

| Select | Out_3 | Out_2 | Out_1 | Out_0 |
|--------|-------|-------|-------|-------|
| ge_3_2 | X     | X     |       |       |
| ge_3_1 |       | X     | X     |       |
| ge_3_0 |       |       | X     | X     |

FIG. 12

```
The 4 2-way UP-1/DN-3 merge output port equations:

Out_3 = ge_3_2 ?              In_3 : In_2    ;    In_2 : 5_dn

Out_2 = ge_3_2 ?                     In_2
              : ( ge_3_1 ? In_3 : In_1 ) ;    In_1 : 4_dn

Out_1 = ge_3_1 ?                     In_1
              : ( ge_3_0 ? In_3 : In_0 ) ;    In_3 : 2_up

Out_0 = ge_3_0 ?              In_0 : In_3    ;    In_0 : 2_dn
```

FIG. 13

```
2-way UP-1/DN-3 merge example: possible inputs for the 4 outputs

Out_3              -- 1st_HI max UP output ; ge_3_2 top select
~~~~~~~~~~~~~~~~~~~~~~~~~~~~~~~~~~~~~~~~~~~~~~~~~~~~~~~~~~~~~~~~~~~
1 --  In_3               -- UP inputs ; Only In_3 can go to max Out_3
0 --  In_2               -- DN inputs ; Only In_2 can go to max Out_3
~~~~~~~~~~~~~~~~~~~~~~~~~~~~~~~~~~~~~~~~~~~~~~~~~~~~~~~~~~~~~~~~~~~

~~~~~~~~~~~~~~~~~~~~~~~~~~~~~~~~~~~~~~~~~~~~~~~~~~~~~~~~~~~~~~~~~~~
1 --  In_3               -- UP inputs ; In_3 aligned to Out_2 column
0 --  In_2   In_1        -- DN inputs ; 2 DN inputs can go to Out_2
~~~~~~~~~~~~~~~~~~~~~~~~~~~~~~~~~~~~~~~~~~~~~~~~~~~~~~~~~~~~~~~~~~~
      Out_2              -- Out_2, 3rd_LO DN output ; ge_3_2 top select ~~~~~~~~~~~~~~~~~~~~~~~~~~~~~~~~~~~~~~~~~~~~~~~~~~~~~~~~~~~~~~~~~~~
1 --         In_3        -- UP inputs ; In_3 aligned to Out_1 column
0 --         In_1  In_0  -- DN inputs ; 2 DN inputs can go to Out_1
~~~~~~~~~~~~~~~~~~~~~~~~~~~~~~~~~~~~~~~~~~~~~~~~~~~~~~~~~~~~~~~~~~~
             Out_1       -- Out_1, 2nd_LO DN output ; ge_3_1 top select ~~~~~~~~~~~~~~~~~~~~~~~~~~~~~~~~~~~~~~~~~~~~~~~~~~~~~~~~~~~~~~~~~~~
1 --                In_3 -- UP inputs ; In_3 aligned to Out_0 column
0 --                In_0 -- DN inputs ; Only In_0 can go to min Out_0
~~~~~~~~~~~~~~~~~~~~~~~~~~~~~~~~~~~~~~~~~~~~~~~~~~~~~~~~~~~~~~~~~~~
                    Out_0 -- 1st_LO min DN output ; ge_3_0 top select
```

FIG. 14

```
UP/DN output lists: 2-way UP-3/DN-1 merge example.

1 --   In_3   In_2   In_1  -- UP inputs; In_3 max, In_1 min
0 --                 In_0  -- DN inputs; In_0 DN max and min 1 --   5_up   4_up   2_up  -- UP sorted input list ; Numeric example
0 --                 4_dn  -- DN sorted input list ; Numeric example Out_3  Out_2  Out_1  Out_0 -- Left-to-right 1-D descending sorted order 5_up   4_up   4_dn   2_up -- Numeric example
 In_3   In_2   In_0   In_1 -- Numeric example
```

FIG. 15

The 4 ordered output lists for the 2-way UP-3/DN-1 merge.

| Out_3 | Out_2 | Out_1 | Out_0 | $ge\_3\_0$ | $ge\_2\_0$ | $ge\_1\_0$ |   |
|---|---|---|---|---|---|---|---|
| In_3 | In_2 | In_1 | In_0 | 1 | 1 | 1 |   |
| In_3 | In_2 | In_0 | In_1 | 1 | 1 | . | <= Example |
| In_3 | In_0 | In_2 | In_1 | 1 | . | . |   |
| In_0 | In_3 | In_2 | In_1 | . | . | . |   |
| 1 | 2 | 2 | 1 | $N_{POSS\_UP}$ |   |   |   |
| 1 | 1 | 1 | 1 | $N_{POSS\_DN}$ |   |   |   |
| 2 | 3 | 3 | 2 | $N_{POSSIBLE}$ |   |   |   |

FIG. 16

Inputs per Output : 2-way UP-3/DN-1 Merge

| Input | Out_3 | Out_2 | Out_1 | Out_0 |
|---|---|---|---|---|
| In_3 | X | X |   |   |
| In_2 |   | X | X |   |
| In_1 |   |   | X | X |
| In_0 | X | X | X | X |

FIG. 17

Select Lines per Output : 2-way UP-3/DN-1 Merge

| Select | Out_3 | Out_2 | Out_1 | Out_0 |
|---|---|---|---|---|
| $ge\_3\_0$ | X | X |   |   |
| $ge\_2\_0$ |   | X | X |   |
| $ge\_1\_0$ |   |   | X | X |

FIG. 18

```
The 4 2-way UP-3/DN-1 merge output port equations:

Out_3 = ge_3_0 ?              In_3 : In_0 ;        In_3 : 5_up

Out_2 = ge_2_0 ?                    In_2           In_2 : 4_up
               : ( ge_3_0 ? In_0 : In_3 ) ;

Out_1 = ge_1_0 ?                    In_1
               : ( ge_2_0 ? In_0 : In_2 ) ;        In_0 : 4_dn

Out_0 = ge_1_0 ?              In_0 : In_1 ;        In_1 : 2_up
```

FIG. 19

```
2-way UP-3/DN-1 merge example: possible inputs for the 4 outputs

Out_3              -- 1st_HI max UP output ; ge_3_0 top select
~~~~~~~~~~~~~~~~~~~~~~~~~~~~~~~~~~~~~~~~~~~~~~~~~~~~~~~~~~~~~~~~~~~~
1 --  In_3               -- UP inputs ; Only In_3 can go to max Out_3
0 --  In_0               -- DN inputs ; In_0 aligned to Out_3 column
~~~~~~~~~~~~~~~~~~~~~~~~~~~~~~~~~~~~~~~~~~~~~~~~~~~~~~~~~~~~~~~~~~~~

Out_2          -- Out_2 , 2nd_HI UP output; ge_2_0 top select
~~~~~~~~~~~~~~~~~~~~~~~~~~~~~~~~~~~~~~~~~~~~~~~~~~~~~~~~~~~~~~~~~~~~
1 --  In_3  In_2         -- UP inputs ; 2 UP inputs can go to Out_2
0 --        In_0         -- DN inputs ; In_0 aligned to Out_2 column
~~~~~~~~~~~~~~~~~~~~~~~~~~~~~~~~~~~~~~~~~~~~~~~~~~~~~~~~~~~~~~~~~~~~

Out_1 -- Out_1 , 3rd_HI UP output; ge_1_0 top select
~~~~~~~~~~~~~~~~~~~~~~~~~~~~~~~~~~~~~~~~~~~~~~~~~~~~~~~~~~~~~~~~~~~~
1 --        In_2  In_1 -- UP inputs ; 2 UP inputs can go to Out_1
0 --              In_0 -- DN inputs ; In_0 aligned to Out_1 column
~~~~~~~~~~~~~~~~~~~~~~~~~~~~~~~~~~~~~~~~~~~~~~~~~~~~~~~~~~~~~~~~~~~~

~~~~~~~~~~~~~~~~~~~~~~~~~~~~~~~~~~~~~~~~~~~~~~~~~~~~~~~~~~~~~~~~~~~~
1 --              In_1 -- UP inputs ; Only In_1 can go to min Out_0
0 --              In_0 -- DN inputs ; Only In_0 can go to min Out_0
~~~~~~~~~~~~~~~~~~~~~~~~~~~~~~~~~~~~~~~~~~~~~~~~~~~~~~~~~~~~~~~~~~~~
                Out_0 -- 1st_LO min DN output ; ge_1_0 top select
```

FIG. 20

```
        Out_7                           -- 1_up_1_dn_1st_HI max ; ge_7_3
~~~~~~~~~~~~~~~~~~~~~~~~~~~~~~~~~~~~~~~~~~~~~~~~~~~~~~~~~~~~~~~~~~~~~
1 --   In_7                             -- UP inputs
0 --   In_3                             -- DN inputs
~~~~~~~~~~~~~~~~~~~~~~~~~~~~~~~~~~~~~~~~~~~~~~~~~~~~~~~~~~~~~~~~~~~~~
           Out_6                        -- 2_up_2_dn_2nd_HI ; ge_7_3
~~~~~~~~~~~~~~~~~~~~~~~~~~~~~~~~~~~~~~~~~~~~~~~~~~~~~~~~~~~~~~~~~~~~~
1 --   In_7  In_6                       -- UP inputs
0 --   In_3  In_2                       -- DN inputs
~~~~~~~~~~~~~~~~~~~~~~~~~~~~~~~~~~~~~~~~~~~~~~~~~~~~~~~~~~~~~~~~~~~~~
              Out_5                     -- 3_up_3_dn_3rd_HI ; ge_6_2
~~~~~~~~~~~~~~~~~~~~~~~~~~~~~~~~~~~~~~~~~~~~~~~~~~~~~~~~~~~~~~~~~~~~~
1 --   In_7  In_6  In_5                 -- UP inputs
0 --   In_3  In_2  In_1                 -- DN inputs
~~~~~~~~~~~~~~~~~~~~~~~~~~~~~~~~~~~~~~~~~~~~~~~~~~~~~~~~~~~~~~~~~~~~~
                  Out_4                 -- 4_up_4_dn_4th_HI ; ge_6_2
~~~~~~~~~~~~~~~~~~~~~~~~~~~~~~~~~~~~~~~~~~~~~~~~~~~~~~~~~~~~~~~~~~~~~
1 --   In_7  In_6  In_5  In_4           -- UP inputs
0 --   In_3  In_2  In_1  In_0           -- DN inputs
~~~~~~~~~~~~~~~~~~~~~~~~~~~~~~~~~~~~~~~~~~~~~~~~~~~~~~~~~~~~~~~~~~~~~
1 --   In_7  In_6  In_5  In_4           -- UP inputs
0 --   In_3  In_2  In_1  In_0           -- DN inputs
~~~~~~~~~~~~~~~~~~~~~~~~~~~~~~~~~~~~~~~~~~~~~~~~~~~~~~~~~~~~~~~~~~~~~
        Out_3                           -- 4_up_4_dn_4th_LO ; ge_5_1
~~~~~~~~~~~~~~~~~~~~~~~~~~~~~~~~~~~~~~~~~~~~~~~~~~~~~~~~~~~~~~~~~~~~~
1 --         In_6  In_5  In_4           -- UP inputs
0 --         In_2  In_1  In_0           -- DN inputs
~~~~~~~~~~~~~~~~~~~~~~~~~~~~~~~~~~~~~~~~~~~~~~~~~~~~~~~~~~~~~~~~~~~~~
           Out_2                        -- 3_up_3_dn_3rd_LO ; ge_5_1
~~~~~~~~~~~~~~~~~~~~~~~~~~~~~~~~~~~~~~~~~~~~~~~~~~~~~~~~~~~~~~~~~~~~~
1 --               In_5  In_4           -- UP inputs
0 --               In_1  In_0           -- DN inputs
~~~~~~~~~~~~~~~~~~~~~~~~~~~~~~~~~~~~~~~~~~~~~~~~~~~~~~~~~~~~~~~~~~~~~
              Out_1                     -- 2_up_2_dn_2nd_LO ; ge_4_0
```

FIG. 21

```
              1st         2nd         3rd
              2-to-1      2-to-1      2-to-1
              Select      Select      Select Out_7 =  ( ge_7_3 ?                     In_7        max_2
                :                       In_3 ) ;  up_1_dn_1_1st_HI Out_6 =  ( ge_7_3 ?  ( ge_6_3 ?         In_6
                            :           In_3 )      max_2
                  :  ( ge_7_2 ?         In_7
                            :           In_2 ) ) ;  max_2
                          up_2_dn_2_2nd_HI Out_5 =  ( ge_6_2 ?  ( ge_5_3 ?         In_5      up_2_dn_1_2nd_HI
                            :  ( ge_6_3 ? In_3
                                     :  In_6 ) )
                  :  ( ge_7_2 ?         In_2      up_1_dn_2_2nd_LO
                            :  ( ge_7_1 ? In_7
                                     :  In_1 ) ) ;
                          up_3_dn_3_3rd_HI Out_4 =  ( ge_6_2 ?  ( ge_5_3 ? ( ge_4_3 ? In_4
                                        :  In_3 )  up_2_dn_2_2nd_HI
                            :  ( ge_5_2 ? In_5
                                        :  In_2 ) )
                  :  ( ge_7_1 ? ( ge_6_1 ? In_6
                                        :  In_1 )  up_2_dn_2_2nd_HI
                            :  ( ge_7_0 ? In_7
                                        :  In_0 ) ) ) ;
                          up_4_dn_4_4th_HI
```

FIG. 22

```
Inputs | Out_4  Out_3  Out_2  Out_1  Out_0
~~~~~~~~~~~~~~~~~~~~~~~~~~~~~~~~~~~~~~~~~~~
  In_4 |   X      X      X      X
  In_3 |          X      X      X      X
~~~~~~~~~~~~~~~~~~~~~~~~~~~~~~~~~~~~~~~~~~~
  In_2 |   X      X      X      X      X
~~~~~~~~~~~~~~~~~~~~~~~~~~~~~~~~~~~~~~~~~~~
  In_1 |   X      X      X      X
  In_0 |          X      X      X      X
~~~~~~~~~~~~~~~~~~~~~~~~~~~~~~~~~~~~~~~~~~~
```

FIG. 23

```
                                        g g g g g g g
                                        e e e e e e e
                                        - - - - - - -
                                        4 4 4 3 3 2 2
                                        - - - - - - -
Out_4  Out_3  Out_2  Out_1  Out_0       2 1 0 2 1 1 0
=============================================================
 In_4   In_3   In_2   In_1   In_0       1 1 1 1 1 1 1
 In_4   In_3   In_1   In_2   In_0       1 1 1 1 1 . 1
 In_4   In_3   In_1   In_0   In_2       1 1 1 1 1 . .
 In_4   In_2   In_3   In_1   In_0       1 1 1 . 1 1 1
 In_4   In_2   In_1   In_3   In_0       1 1 1 . . 1 1
 In_4   In_2   In_1   In_0   In_3       1 1 1 . . . 1
 In_4   In_1   In_3   In_2   In_0       1 1 1 1 . 1 . 1
 In_4   In_1   In_3   In_0   In_2       1 1 1 1 . 1 . .
 In_4   In_1   In_2   In_3   In_0       1 1 1 . . 1 . 1
 In_4   In_1   In_2   In_0   In_3       1 1 1 . . . . 1
 In_4   In_1   In_0   In_3   In_2       1 1 1 1 . . . .
 In_4   In_1   In_0   In_2   In_3       1 1 1 . . . . .
 In_2   In_4   In_3   In_1   In_0       . 1 1 . 1 1 1
 In_2   In_4   In_1   In_3   In_0       . 1 1 . . 1 1
 In_2   In_4   In_1   In_0   In_3       . 1 1 . . . 1
 In_2   In_1   In_4   In_3   In_0       . . 1 . . 1 1
 In_2   In_1   In_4   In_0   In_3       . . 1 . . . 1
 In_2   In_1   In_0   In_4   In_3       . . . . . . 1
 In_1   In_4   In_3   In_2   In_0       1 . 1 1 . 1 . 1
 In_1   In_4   In_3   In_0   In_2       1 . 1 1 . 1 . .
 In_1   In_4   In_2   In_3   In_0       1 . 1 . . 1 . 1
 In_1   In_4   In_2   In_0   In_3       1 . 1 . . . . 1
 In_1   In_4   In_0   In_3   In_2       1 . 1 1 . . . .
 In_1   In_4   In_0   In_2   In_3       1 . 1 . . . . .
 In_1   In_2   In_4   In_3   In_0       . . 1 . . 1 . 1
 In_1   In_2   In_4   In_0   In_3       . . 1 . . . . 1
 In_1   In_2   In_0   In_4   In_3       . . . . . . . 1
 In_1   In_0   In_4   In_3   In_2       1 . . 1 . . . .
 In_1   In_0   In_4   In_2   In_3       1 . . . . . . .
 In_1   In_0   In_2   In_4   In_3       . . . . . . . .
=============================================================
```

FIG. 24

SINGLE-STAGE MERGE SORTING METHOD AND APPARATUS

BACKGROUND OF THE INVENTION

Embodiments of the present invention generally relate to a method and apparatus to merge two or more sorted input lists of values, which can be referred to as k sorted input lists (where k>=2), into a single sorted output list of values, using a single-stage set of operations. At least one of the input lists has 2 or more values. The action of merging k sorted input lists into a single sorted output list is referred to herein as a k-way merge.

A single-stage set of operations includes one set of input port values, one set of output port values, and whatever internal logic is needed in order to map an input value to the correct location in the sorted output list. Each such single-stage process is preferably configured to be implemented in hardware, with all stage operations executing in parallel. The hardware devices are defined in a straightforward manner using Hardware Description Language ("HDL") modules.

Single-stage merge devices are preferably hard-wired in the target hardware, such as in field-programmable gate arrays ("FPGAs"). The implemented merge process is therefore data-oblivious. In other words, all of the sorting and merging operations are predefined, and are independent of the input values. Although these single-stage devices are targeted to be used in hardware, they can also optionally be used in central processing unit ("CPU") software applications or other hardware implementations where data-oblivious sorting and merging are desired, including for example graphical processing units ("GPU"), application specific integrated circuits ("ASIC") and for field-programmable gate arrays ("FPGA").

The design for each individual output port in the sorted output list is independent of the designs for the other output ports, so the number of device output ports need not be the same as the total number of input values. If there are fewer output ports than input values, the device is called a filter. Examples of single-output filters, using N input values, are N-max, N-min, and N-median filters.

These single-stage devices are preferably implemented most efficiently in asynchronous combinatorial logic, which uses no internal clocking. In this case, the input values directly propagate through the internal logic to their correct port locations in the sorted output list.

If desired, the single-stage operations can also be synchronously clocked. Furthermore, single-stage operations can easily be pipelined in a synchronous system, so that in each clock cycle, new input data can be applied, and output data read out, even though input data needs more than one clock period to propagate to the outputs.

Embodiments for k-way merge processes, where k>2, will be discussed later. Most of this specification will describe single-stage 2-way merge processes, which merge 2 sorted input lists into a single sorted output list, before then elaborating on how more than two sorted input lists can be merged into a single sorted output list.

A 2-way merge has been typically performed using a multistage sorting network. The primary benefit of using the set of embodiments disclosed here, in lieu of such known systems, is the reduction of the several serial stages in such a sorting network into a single-stage set of operations, producing a significantly faster 2-way merge process.

The 2-way merge processes of embodiments of the present invention produces a stable sort, in which equal values in the sorted output list are in the same order that they occurred in the input lists. For a stable sort, one of the two sorted input lists will have a higher stable order than the other. An input value from the list with the higher order will be mapped into the output list before an equal value from the list with the lower stable order.

Commonly used multistage sorting networks, such as Kenneth Batcher's Odd-Even Merge Sort and Bitonic Merge Sort lack the ability to produce a stable merge sort because they fail to give preference to values that come from an input list with a higher stable order. Also, these multistage sorting networks are significantly slower than the single-stage merge sorters disclosed here.

If the 2-way merge process of embodiments of the present invention are used to gradually merge 2 large sorted inputs lists, half of a calculated merge output list is added to the final output list in each output event, and the other half is retained to be used in subsequent 2-way merge process events. Because the 2-way merge process is a single-stage operation, the merge comparison results are used in a straightforward manner to determine which input list the retained values must be returned to, and in what order.

The classic Merge Sort produces a stable merge of 2 large sorted input lists, but it adds only one value to the sorted output list per clock cycle. The 2-way merge process of embodiments of the present invention can be much faster than Merge Sort, as multiple values can be added to the sorted output list at a time.

BRIEF SUMMARY OF EMBODIMENTS OF THE PRESENT INVENTION

Single-Stage 2-Way Merge of 2 Sorted Input Lists

As mentioned above, the set of embodiments disclosed here can provide single-stage 2-way merge sorters, which produce a stable merge of 2 sorted input lists into a single sorted output list.

The 2 sorted input lists in this 2-way merge are preferably defined in a 2-row 2-D array. One list is called the UP list, and is placed into the UP row 1. The other list is placed into the lower DN row 0.

Each row contains an independently sorted list of values, and there is no known relationship between the UP and DN values prior to the merging process. An example of such a 2-D array is illustrated in FIG. 1. Both the UP and DN list have 2 values, and this merge is called a 2-way UP-2/DN-2 merge. The "UP" signifier is used to indicate that the values in that array have a higher order of stability over the values in the DN array. FIG. 1 also includes an example of 2 UP/DN sorted input lists, with specific numeric values. To help the user better follow the concepts being described herein, when referring to values in the UP array, an "up" suffix is used, and when referring to values in the DN array, a "dn" suffix is used, so that the stable property of 2-way merges can be analyzed and understood during the merge process.

The number of values in the UP/DN lists are named NUP and NDN, respectively. The number of values in a sorted output list containing all values in these 2 lists is therefore NOUT=NUP+NDN. In FIG. 1, both NUP and NDN are equal to 2, and NOUT=4.

All sorted lists described herein are preferably arranged in non-increasing order from the leftmost value in the list to the rightmost value in the list. To illustrate this, consider a list where the max of the UP list is on the left, and is, for example, preferably named In_(NOUT−1), which is In_3 for the UP-2/DN-2 FIG. 1 merge. The min of the UP list is on the right, most preferably named In_NDN, which is In_2 in FIG. 1. The max of the DN list is on the left, preferably named In_(NDN−1), which is In_1 in FIG. 1. The min of the DN list is on the right, preferably named In_0.

If a stable sorting process is being implemented, the input list with the higher stable sort property is set as the UP list. In other words, a value from the UP list will precede an equal value in the DN list when they are merged into the sorted output list.

The values in each input list are already in order, so only cross list comparisons are required in order to determine the full merge of the two lists. The number of comparison needed for a full merge is then NCOMP=NUP*NDN.

For the 2-way merge comparisons, a true comparison result indicates that the UP input is greater-than-or-equal-to (≥) the DN input it is compared to. This consistent definition of comparison result signals produces the stable character of the 2-way merge sort process. The comparison result signals are named "ge_", followed by the input number of the UP input, a "_" underscore, and the input number of the DN input. For example, ge_3_0 is the comparison result when UP input In_3 is compared to see if it is ≥DN input In_0.

Once the NUP and NDN input ports are created, and the NCOMP cross list comparisons are defined, the design of a single-stage merge sorter consists of generating an equation for each output port in the sorted output list. Such an equation is preferentially a ternary or conditional equation. In hardware, conditional equations can be defined using 2-to-1 multiplexers ("muxes").

Each output port will have a specific number of possible inputs that can go to that output in a merge process. For example, the overall max output port will only have 2 possible inputs, the maxes of each input list. Likewise, the overall min output port will only have 2 possible inputs, the mins of each input list.

The number of UP possible inputs for an output port is named NPOSS_UP, and the number of DN possible inputs for that output is called NPOSS_DN. The total possible inputs for an output port is then NPOSSIBLE=NPOSS_UP+NPOSS_DN. For the max and min output ports, NPOSS_UP and NPOSS_DN are both 1, and NPOSSIBLE is of course 2.

With NPOSSIBLE the number of possible inputs that can go to an output port, NPOSSIBLE-1 comparison result signals are used to map the correct input to that output port. Each of the comparison result signals acts as a 2-to-1 mux's select line, the Boolean signal used to select which of 2 mux inputs goes to the mux output. FIG. 2 illustrates how the Out_2 port is implemented in hardware for the 2-way UP-2/DN-2 merge, using 2 levels of 2-to-1 muxes. All 4 inputs can go to Out_2, and the 3 mux select lines which determine which input will map to Out_2 are ge_InUP_InDN comparison result signals.

The mux whose output is the output port is referred to herein as the top mux. In FIG. 2, the top mux is the rightmost mux, whose output is Out_2. The top mux select line in FIG. 2 is ge_3_1.

If NPOSSIBLE is even, then the top mux select line divides the set of inputs into 2 equal and exclusive subgroups, as ge_3_1 does in FIG. 2. If NPOSSIBLE is odd, then the top mux select line divides the set of inputs into 2 exclusive subgroups in which the number of values in the two subgroups differs by only 1. By enforcing this equal-or-differ-by-1 requirement, the maximum input-to-output propagation delay of the merge device is minimized.

In order to begin the design process for a single-stage 2-way merge sorter, a table can be constructed which contains the set of all sorted output lists that can be generated from the 2 sorted input lists. The elements of the sorted output lists are defined in the manner shown for the UP and DN lists at the top of FIG. 1. Each sorted output 1-D list is preferably presented in order from the max value on the left to the min value on the right, and is entered into the leftmost NOUT columns in the table row. The leftmost data column headings in this table are the sorted output port names, from the max Out_(NOUT−1) on the left to the min Out_0 on the right.

To the right of the NOUT output port columns in the table, NCOMP columns are preferably added, with each additional column containing the Boolean results for one of the comparison result select lines. For each row, these comparison result columns are preferably filled in appropriately, based on the sorted order of the input ports in the leftmost columns of this row.

An example of such a table is illustrated in FIG. 3A. The data in this table refers to a 2-way UP-2/DN-2 merge, with each UP/DN input list containing 2 sorted values, as illustrated in FIG. 1. The analysis of this and similar tables will be discussed in depth in the detailed description section below. In the FIG. 3A table, and in other similar tables, the 0/false states for the Boolean ge_InUP_InDN comparison result select lines are displayed using a '.'-a period. The formula: "ge_InUP_InDN" is shorthand for the comparison of whether InUP is greater than or equal to InDN.

Using the data in the table for all sorted output lists, a conditional equation is constructed for each output port in the 2-way merge device. In order to define each equation, the following 3 output port attributes are preferably determined:
1) Which are the NPOSSIBLE inputs that can possibly map to that output;
2) Which are the NPOSSIBLE-1 comparison results signals that are used as select lines in the output port equation; and
3) Which is the top comparison result signal for the output, the mux select line that divides that output's group of inputs into 2 equal-or-differ-by-1 exclusive subgroups.

Embodiments of the present invention relate to a method for creating a stable single-stage hardware merge sorter for merging input values of at least two pre-sorted input lists, including ranking the at least two pre-sorted input lists, establishing a number of input ports equal to a sum total of a number of input values of the at least two pre-sorted input lists, establishing a number of output ports equal to the sum total of the number of input values of the at least two pre-sorted input lists, determining all possible sorted output combinations of input ports for a predetermined size of the at least two pre-sorted input lists, determining a set of cross-list comparisons in which each value in a higher-ranked list is compared to each value in each lower-ranked list using a Boolean comparison operation, for each respective output port, determining a set of input values of the at least two pre-sorted input lists that could possibly map to that respective output port, for each respective output port, determining comparisons that map possible input values to that respective output port, for each respective output port, creating a conditional equation which uses the port's set of comparisons in order to map each of the output port's possible input values to that respective output port, and programming or otherwise creating a semiconductor to implement the determined comparisons. In the method, programming or otherwise creating a semiconductor can include programming a field programmable gate array. The method can also include building a table that illustrates which input ports can map to which output ports. Optionally, for each respective output port, the determined comparisons can number one less than the number that was determined as representing how many of the number of input values of the at least two pre-sorted input lists could possibly correspond to each output port.

In one embodiment, multiplexers can be used to map the input ports to output ports based on the determined comparisons. In one embodiment, programming or otherwise creating the semiconductor can include programming or otherwise creating the semiconductor such that the multiplexers are configured to pass an input value to their output based on states of the output port's set of comparisons. In the method, each multiplexer can include a Boolean multiplexer select line. Each determined comparison can be applied to a select line of a respective multiplexer as a Boolean operator. The Boolean comparison operation can be a greater than or equal to operation. In the method, ranking the at least two pre-sorted input lists can include ranking based on order of stability.

In one embodiment, programming or otherwise creating the semiconductor can include programming or otherwise creating the semiconductor to have parallel hardware architecture and/or programming or otherwise creating the semiconductor such that it performs the determined comparisons in a single parallel process and does not perform the process as a series of discretely timed iterative steps.

The input values of each of the at least two pre-sorted input lists can be presorted in numerical order or in reverse numerical order. Optionally, determining comparisons that can be used can include determining comparisons that need not be performed. The at least two presorted input lists can include two pre-sorted input lists. The at least two presorted input lists can include more than two pre-sorted input lists. Programming or otherwise creating a semiconductor can include programming or otherwise creating a semiconductor such that individual multiplexers of an array of multiplexers within the semiconductor each use a comparison signal as a Boolean operator to determine which input to map to an output of each of the individual multiplexers.

The method can include inputting at least two pre-sorted input lists into the programmed semiconductor and activating the semiconductor. Optionally, inputting at least two presorted input lists into the programmed semiconductor of claim 1 can include inputting at least two presorted input lists into a field programmable gate array.

Embodiments of the present invention also relate to a method for creating a stable single-stage hardware merge sorter for merging input values of at least two pre-sorted input lists including ranking the at least two pre-sorted input lists, establishing a number of input ports equal to a sum total of a number of input values of the at least two pre-sorted input lists, establishing a number of output ports equal to the sum total of the number of input values of the at least two pre-sorted input lists, determining all possible sorted output combinations of input ports for a predetermined size of the at least two pre-sorted input lists, determining a set of cross-list comparisons in which each value in a lower-ranked list is compared to each value in each higher-ranked list using a Boolean comparison operation, for each respective output port, determining a set of input values of the at least two pre-sorted input lists that could possibly map to that respective output port, for each respective output port, determining comparisons that map possible input values to that respective output port, for each respective output port, creating a conditional equation which uses the port's set of comparisons in order to map each of the output port's possible input values to that respective output port, and programming or otherwise creating a semiconductor to implement the determined comparisons. Optionally, in the method, the Boolean comparison operation can be a less than operation.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 2—Out_2 2-to-1 multiplexer implementation in the 2-way UP-2/DN-2 merge;

FIG. 3A—Table with all 6 2-way UP-2/DN-2 sorted output lists, grouped by Out_3 inputs;

FIG. 3B—Table with all 6 2-way UP-2/DN-2 sorted output lists, grouped by Out_0 inputs;

FIG. 4—The conditional output equation for each of the 4 UP-2/DN-2 merge outputs;

FIG. 5—Table indicating which inputs can go to each of the UP-2/DN-2 merge outputs;

FIG. 6—Table indicating the select lines used in each UP-2/DN-2 merge output equation;

FIGS. 7—2-row 2-D array of UP-2/DN-2 merge outputs, and final 1-D sorted output list;

FIGS. 8—2-row 2-D arrays of UP-2/DN-2 merge outputs versus their inputs;

FIGS. 9—2-row 2-D arrays of UP-1/DN-3 merge outputs, and final 1-D sorted output list;

FIG. 10—Table with all 4 2-way UP-1/DN-3 sorted output lists, grouped by Out_3 inputs;

FIG. 11—Table indicating which inputs can go to each of the UP-1/DN-3 merge outputs;

FIG. 12—Table indicating the select lines used in each UP-1/DN-3 merge output equation;

FIG. 13—The conditional output equation for each of the 4 UP-1/DN-3 merge outputs;

FIGS. 14—2-row 2-D arrays of UP-1/DN-3 merge outputs versus their inputs;

FIGS. 15—2-row 2-D arrays of UP-3/DN-1 merge outputs, and final 1-D sorted output list;

FIG. 16—Table with all 4 2-way UP-3/DN-1 sorted output lists, grouped by Out_3 inputs;

FIG. 17—Table indicating which inputs can go to each of the UP-3/DN-1 merge outputs;

FIG. 18—Table indicating the select lines used in each UP-3/DN-1 merge output equation;

FIG. 19—The conditional output equation for each of the 4 UP-3/DN-1 merge outputs;

FIGS. 20—2-row 2-D arrays of UP-3/DN-1 merge outputs versus their inputs;
FIGS. 21—2-row 2-D arrays of UP-4/DN-4 merge outputs versus their inputs;
FIG. 22—Highest 4 UP-4/DN-4 conditional output equations: top select line divisions;
FIGS. 23—3-way 2/1/2 Outputs-vs-Inputs table; and
FIGS. 24—3-way 2/1/2 All sorted output lists table.

DETAILED DESCRIPTION OF THE INVENTION

Single-Stage 2-Way Merge

Figures 1, 2:
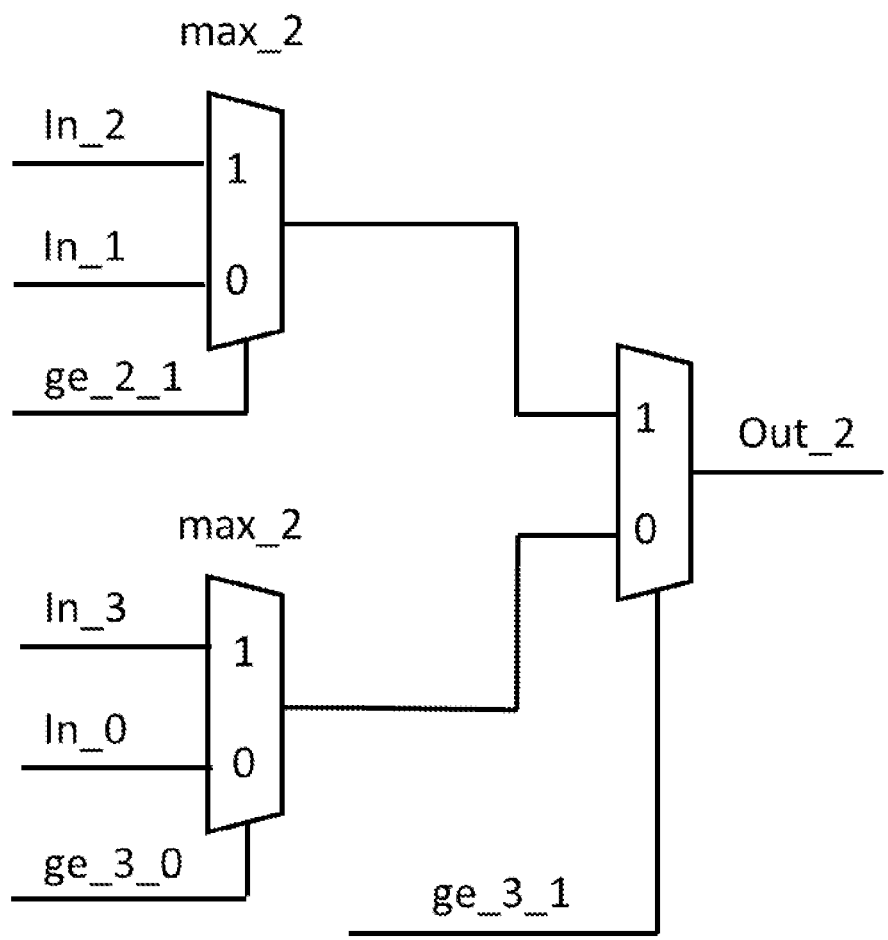
FIGS. 1—2-row 2-D array of inputs in the 2-way UP-2/DN-2 merge.

Some attributes of a 2-way merge of embodiments of the present invention have been discussed earlier, but a thorough discussion of this 2-way merge system follows. To help keep concepts organized and guide the reader, several subsections are used in this discussion:

Single-stage 2-way merge: Main table creation and analysis, UP-2/DN-2 example.
Single-stage 2-way merge: Output port design shortcuts, UP-2/DN-2 example.
Single-stage 2-way merge: UP-1/DN-3 example.
Single-stage 2-way merge: UP-3/DN-1 example.
Single-stage 2-way merge: UP-4/DN-4 example.

Single-Stage 2-Way Merge: Main Table Creation and Analysis: UP-2/DN-2 Example.

As mentioned previously, a method that can optionally be used to define the output port equations for a 2-way merge is to create and analyze a table whose rows contain all possible output orderings of the $N_{out}$ UP and DN input values, after they are merged into a single sorted output list.

Each table row also lists all NCOMP cross-list comparison results (which are illustrated in the format of ge_InUP_In DN in FIGS. 3A, 3B, 10 and 16) associated with the order of the input ports in this particular row's sorted output list.

The table in FIG. 3A, for the 2-way UP-2/DN-2 merge, is an example of this type of table. In the FIG. 3A table, the inputs in both the Out_3 and Out_2 columns are grouped together for that output. It is fairly easy then to use the FIG. 3A table to create the conditional equations for Out_3 and Out_2, which are the top 2 output port equations illustrated in FIG. 4. The Out_2 equation, when implemented in hardware, produces the FIG. 2 multiplexer circuit. In the FIG. 3A table, the sorted output list that represents the numeric example introduced in FIG. 1 is highlighted using the "<=Example" note, with dashed lines above and below the line.

The FIG. 3A table is not too helpful when designing the Out_1 and Out_0 equations, because the inputs listed in those columns are not grouped together. Therefore, the rows in the FIG. 3A table are rearranged so that the Out_1 and Out_0 inputs are grouped together, which produces the table in FIG. 3B. Once again, it is fairly easy to use FIG. 3B table to create the Out_1 and Out_0 output port equations, which are the bottom 2 conditional equations in FIG. 4. In FIG. 3B, the list representing the numeric example from FIG. 1 is highlighted in the same manner that was used in FIG. 3A.

In FIG. 4, comparison result signals that are true for the FIG. 1 numeric example, are underlined and in bold font. The input mapped to a given output is also underlined and in bold font. At the right side of the figure, the mapped input and its numeric value are listed for each output.

Earlier, it was said that 3 attributes are needed in order to create each output port equation for a 2-way merge. Which NPOSSIBLE inputs go to a given output is the first attribute.

In FIGS. 3A and 3B, the inputs that go to a given output are found in the data column for that output port, so this attribute is easily determined.

Which NPOSSIBLE-1 comparison select line signals are used for a given output port is the second attribute needed in designing an output port equation. It can be a little more difficult to determine these using tables like those in FIGS. 3A and 3B. There are 4 UP-2/DN-2 select line signals, but only 3 are used for each of the Out_2 and Out_1 equations.

In FIGS. 3A and 3B tables, it is straightforward to determine which 3 select line signals are able to produce the output port equations presented in FIG. 4. It can be seen that ge_2_0 is not appropriate for the Out_2 equation, because both true and false ge_2_0 conditions can select the same Out_2 input. Likewise, ge_3_1 is not appropriate for the Out_1 equation, because both true and false ge_3_1 conditions can select the same Out_1 input.

The top select line is the third attribute needed in the output port design. The top select lines for the Out_3 and Out_0 equations are obvious, because each has only 1 select line. For Out_2, ge_3_1 is the top select line, as its state illustrated in the FIG. 3A table divides the 4 possible inputs into 2 groups of 2. For Out_1, ge_2_0 is the top select line, as its state illustrated in the FIG. 3B table also divides the 4 possible inputs into 2 groups of 2.

Single-Stage 2-Way Merge: Output Port Design Shortcuts, UP-2/DN-2 Example.

Single-Stage 2-Way Merge: Shortcut for Creating an Outputs-Vs-Inputs Table.

An outputs-vs-inputs table can be constructed using data such as the data found in the FIGS. 3A and 3B tables. The table in FIG. 5 is such a table for UP-2/DN-2 merge. This table is created with NOUT columns, with column headers ranging from Out_(NOUT−1) on the left to Out_0 on the right. In FIG. 5, the rows in the table are arranged from a top max of In (NOUT−1) down to a min of In_0, preferably with a dashed line separating the UP from the DN inputs.

A shortcut can optionally be used to create an outputs-vs-inputs table, such as the FIG. 5 table, without first creating an all-sorted-output-lists table, such as the tables in FIGS. 3A and 3B. This table is created with the NOUT column headers and NOUT row labels described just above, once again with a dashed line separating the UP from the DN inputs.

To fill in this table, start with the max UP list input, at the topmost row. For this input, mark the leftmost column, and consecutive columns to the right, marking a total of NDN+1 columns. For each remaining UP input, move 1 column to the right, and mark NDN+1 consecutive columns.

After the UP input rows are marked, mark the DN input rows in an analogous manner, except that the number of consecutive columns that are marked is NUP+1, not NDN+1. Therefore, for the max DN input, mark the leftmost column, and consecutive columns to the right, marking a total of NUP+1 columns. For each remaining DN input, move 1 column to the right, and mark NUP+1 consecutive columns.

As stressed earlier, the initial step used in the design of single-stage 2-way merge devices is preferably to produce a complete set of all output lists which can be constructed from the 2 sorted input lists. Tables showing such a complete set of sorted output lists have already been illustrated in FIGS. 3A and 3B. A complete set of all output lists can be constructed in a number of ways, but using the data in a table such as the FIG. 5 table can be an efficient way to produce this list.

For example, when using the data in FIG. 5 table, first loop through the 2 possible inputs for the output max value, Out_3 in this case. Once one of these is selected to be the input mapped to Out_3, move onto the next lowest output port, Out_2. This and all remaining ports can be treated in the same manner. Loop through the max output UP input that is not already in the list, and the max output DN input that is not already in the list. After one of these is selected in the loop, move onto the next lower output.

Eventually, there may be only 1 UP or 1 DN input that can map to the targeted output. This is especially true when choosing the min output, the final sorted output value. After the input has been determined for the min output, the unique output list is printed out, and the process returns to the lowest output port where there is still a loop input that has not been selected. If all loop inputs have been selected for all output ports, the list of sorted output values is complete.

Single-Stage 2-Way Merge: Shortcut for Creating an Outputs-Vs-Select_Lines Table.

An outputs-vs-select_lines table can be constructed using data such as that found in the FIGS. 3A and 3B tables, and the output port equations developed in FIG. 4. The table in FIG. 6 is such a table for UP-2/DN-2 merge. The rows in this table are sorted from top to bottom first by descending select line UP input and then by descending select line DN input. The column headers are the same as found in the associated outputs-vs-inputs table, such as FIG. 5 for the UP-2/DN-2 merge. In FIG. 6, a dashed line is used to separate select lines with differing UP inputs.

Although the table in FIG. 6 was created from the FIGS. 3A and 3B tables, and the output port equations developed in FIG. 4, a shortcut can be used to create it directly, without the need for the type of information found in FIGS. 3A, 3B, and 4. To fill in the table, first mark the upper left table location. This is the max output column, and the row with the select line that compares the max UP input to the max DN input. In this row, also mark the column just to the right, because all select lines are used for 2 and only 2 consecutive output ports.

Next, move one column to the right, the Out_2 column in the FIG. 6 table. If there are additional select lines which have the max UP input, mark the row with max UP input and with the DN input that is one less than the max. This is called a Decrement_DN_input step. Such a mark is also made in 2 consecutive columns. For the FIG. 6 table, this consists of marking the Out_2 and Out_1 cells in the ge_3_0 row.

Also in the 2nd column to the right, the FIG. 6 table Out_2 column, determine if there is an UP input that is one less than the max UP input. If so, mark the row with the select line which compares this new UP input to the max DN input. This is called a Decrement_UP_input step. Once again, mark the column just to the right in the same row. For the FIG. 6 table, this consists of marking the Out_2 and Out_1 cells in the ge_2_1 row.

Move then into the next column to the right. All columns beginning with this column use the same rules to mark cells in that column, and then cells one column to the right. In the FIG. 6 table, this column is the Out_1 column.

First, if the lowest UP input in the select lines in the column to the left is greater than the minimum UP input, decrement that lowest UP input and find the select line with this new lowest UP input matched with the max DN input. Mark the cell for this select line and column, and mark the cell one column to the right in the same row. This is a Decrement_UP_input step, and there can only be one of these per column. In the FIG. 6 table, the lowest UP input in the Out_2 column is the minimum UP input, so no marks are made in the Out_1 and Out_0 columns based on the Decrement_UP_input rule. Also for this column, determine if there are select line signals in the column to the left in which the lowest DN input for a given UP input is greater than In_0. If so, mark the select line row with that UP input, but with the DN input decremented by 1. If this is done, mark the column to the right in that same row. This is a Decrement_DN_input step, and there can be more than one of these per column.

In the Out_2 column of the FIG. 6 table, the lowest DN input for UP input In_3 is In_0, so select lines with UP input In_3 are ignored. However, In the Out_2 column, the lowest DN input for UP input In_2 is In_1, so the ge_2_0 select line row is marked, for both columns Out_1 and Out_0.

At the rightmost Out_0 column, all select lines with a DN input of In_0 have already been marked, so no new cells are marked in the Out_0 column. In the Out_0 column, only one cell has already been marked. It is in the lowest select line row, the comparison result that compares the minimum UP input to minimum DN input, which is ge_2_0 in the FIG. 6 table. The outputs-vs-select_lines table is now complete.

Single-Stage 2-Way Merge: Shortcut for Determining an Output's Top Select Line.

In order to determine the top select line for an output, the output ports are first arranged in a 2-row 2-D array, much like the input port UP/DN 2-D array. FIG. 7 illustrates such an output port array for the UP-2/DN-2 merge. The primary difference between the FIG. 7 output array and the FIG. 1 input array is that there is a relationship between the UP and DN output ports in FIG. 7. In particular, the min UP output port, Out_2 in FIG. 7, is ≥ the max DN output port, Out_1 in FIG. 7. The resultant output port sorted order is illustrated in the middle of FIG. 7, and the associated numeric values and input ports are listed at the bottom of FIG. 7.

If there are fewer UP outputs than DN outputs, the UP outputs are left aligned to the DN outputs. If there are fewer DN outputs than UP outputs, the DN outputs are right aligned to the UP outputs. NUP equals NDN in FIG. 7, so no UP or DN output port alignments are needed. There are no empty cells in either the UP or DN rows of the 2-row 2-D array.

In FIG. 8, each of the 4 outputs is illustrated relative to the 2-row set of inputs which can go to that output. There is only one select line for both the Out_3 max and Out_0 min ports, so the top select line is determined by the input ports which are in that output's columns. Thus, the Out_3 top select line is ge_3_1 and the Out_0 top select line is ge_2_0.

There is one important general rule that the particular Out_3 and Out_0 top select lines follow. This rule states that, if either NPOSS_UP or NPOSS_DN is odd, the top select line will be determined using the middle UP input if NPOSS_UP is odd, or the middle DN input if NPOSS_DN is odd. For Out_3 and Out_0, both NPOSS_UP and NPOSS_DN are odd, so the middle possible input column, the only possible input column, is used to determine the top select line.

This odd-NPOSS_UP-or-odd-NPOSS_DN rule is trivial for the max and min ports of any 2-way merge, but is important as the number of NUP and NDN inputs increase. This will be noted in other sections of this detailed description. However, there will be no ongoing focus on the 2-way merge max and min output ports.

For the FIG. 8 middle 2 outputs, Out_2 and Out_1, NPOSS_UP and NPOSS_DN are both even. In this case, a vertical midline can be identified. The number of columns to the left of the midline will be equal to the number of columns to the right of the midline. It is clear for Out_2 and Out_1 in FIG. 8 that the midline is between the 2 input columns. For UP output Out_2, the top select line is determined using the inputs in the column to the left of the midline. Therefore, the Out_2 top select line is ge_3_1. The top select line for the DN output, Out_1, is determined using the inputs in the column to the right of the midline. The Out_1 top select line is therefore ge_2_0.

There is a new terminology introduced in FIG. 8. UP outputs are referred to as 1st_HI for the max UP output on the left, the 2nd_HI for the 2nd highest UP output, one column to the right, and so on. The DN outputs are referred to as 1st_LO for the rightmost min output, the 2nd_LO for the 2nd lowest DN output, one column to the left, and so forth. This terminology can be useful in determining the number of columns which have inputs that can go to that output. A 1st_*output only has one column of possible inputs, a 2nd_*output has 2 columns of possible inputs, et cetera. The inputs are left aligned to an UP output column, as can be seen for Out_3 in FIG. 8, and the inputs are right aligned to a DN output column, as illustrated for Out_0 in FIG. 8.

The discussion thus far focuses on a single top select line for a given output port. This top select line divides the inputs into 2 distinct equal-or-differ-by-1 input subgroups. When dealing with large NUP and NDN lists, each of the distinct input subgroups may need its own top select line. By examining each input subgroup separately, the top select line for an input subgroup can be determined in a manner similar to that used for the determination of the top select line for the targeted output port.

Single-Stage 2-Way Merge: UP-1/DN-3 Example.

Another 2-way merge example with NOUT==4 is the UP-1/DN-3 merge. There is only 1 UP input for this merge, In_3, and 3 DN inputs range from the max of In_2 on the left to the min of In_0 on the right. FIG. 9 illustrates the UP-1/DN-3 input ports organized into a 2-row array. Example numeric values matching this 2-row array are shown just below the top 2-row array. The UP-1/DN-3 1-D sorted output order is listed below the 2 input arrays in FIG. 9, and this is the same sorted output order listed for the UP-2/DN-2 merge listed in FIG. 7. The example numeric values and their associated input ports are listed below the 1-D sorted output port list at the bottom of FIG. 9, indicating the sorted output order of the example values.

There are only 4 possible UP-1/DN-3 sorted output lists, and these are illustrated in the FIG. 10 table. There are also only 3 ge_InUP_InDN select lines for the UP-1/DN-3 merge. The sorted input order associated with the example numeric values is highlighted in the same manner as was done in FIGS. 3A and 3B. The UP-1/DN-3 outputs-vs-inputs table is illustrated in FIG. 11. In_3 is the only UP input, so it is marked in NDN+1==4 consecutive columns, i.e., all 4 columns. Each of the DN inputs only marks NUP+1==2 consecutive columns.

The outputs-vs-select_lines UP-1/DN-3 table is illustrated in FIG. 12. There is only 1 UP input, so there are no Decrement_UP_input steps. The Out_2 and Out_1 columns both contain one Decrement_DN_input step.

These tables are used to create the UP-1/DN-3 output port equations, which are found in FIG. 13. The use of underlined and bold font in FIG. 13, as well as the specification of the mapped input's numeric value, matches that in FIG. 4. FIG. 14 illustrates the 2-row arrays of possible inputs that can go to each output. The single UP input, In_3, is placed into the same column as the output port. Because there are an odd number of UP inputs, the In_3 column determines the top mux select line for each output. The top select lines for Out_2 and Out_1 are ge_3_2 and ge_3_1, respectively.

Although there are 3 DN inputs, there are never more than 2 DN inputs in an UP-1/DN-3 output equation. In general, the maximum number of DN inputs in any output equation is NUP+1.

Single-Stage 2-Way Merge: UP-3/DN-1 Example.

The 2-row 2-D input port array for the 2-way UP-3/DN-1 merge is illustrated in FIG. 15. Example input numeric values are listed in an associated 2-row array just below the input port array. The 1-D sorted output order, listed just below the input numeric value array, is once again no different than that of the UP-2/DN-2 and the UP-1/DN-3 merges. The example numeric sorted output values, and their associated input ports, are listed at the bottom of FIG. 15.

The 4 possible UP-3/DN-1 sorted output lists are illustrated in the FIG. 16 table. As was true for the UP-1/DN-3 merge, there are only 3 ge_InUP_InDN select lines for the UP-3/DN-1 merge. The 1-D sorted order associated with the example numeric values is highlighted in the same manner as was done in FIGS. 3A, 3B and 10.

The UP-3/DN-1 outputs-vs-inputs table is illustrated in FIG. 17. The number of outputs that are marked for each UP input are NDN+1==2. The single DN input, of course, is used for all NUP+1==4 output ports.

The UP-3/DN-1 outputs-vs-select_lines table is illustrated in FIG. 18. Although the marks in FIG. 18 match those in FIG. 12, the two tables are constructed differently. The ge_2_0 and ge_1_0 marks in FIG. 18 are created by Decrement_UP_input steps, whereas the ge_3_1 and ge_3_0 marks in FIG. 12 are created by Decrement_DN_input steps.

The 4 UP-3/DN-1 conditional output equations are illustrated FIG. 19. The use of underlined and bold font, as well as specifying the mapped input's numeric value, matches that in FIGS. 4 and 13. The 2-row input arrays are displayed for each of the 4 outputs in FIG. 20. For each UP output, the single DN input is aligned to the output port column. The top select lines are preferably determined from FIG. 20 using the inputs in the column containing the single DN input, which is therefore the output column. The preferred UP-3/DN-1 top select lines are therefore ge_2_0 for Out_2 and ge_1_0 for Out_1.

Although there are 3 UP inputs, there are never more than 2 UP inputs in an UP-3/DN-1 output equation. In general, the maximum number of UP inputs in any output equation is NDN+1.

Single-Stage 2-Way Merge: UP-4/DN-4 Example.

A more comprehensive 2-way merge, an UP-4/DN-4 merge, is presented here and used for an in-depth discussion of top select lines, and how various 2-way merge designs are implemented using an HDL language.

FIG. 21 illustrates 7 outputs-vs-inputs 2-D arrays for the UP-4/DN-4 merge. Only the trivial Out_0 min output is not presented. Each 2-D array group has an *_up__dn__HI/LO name, which can be considered the name of an HDL module designed to produce the target output, using the set of possible inputs. After that name and a semicolon, there is a ge_InUP_InDN signal name, which is top select line for the output port equation.

The FIG. 21 Out_6 array setup is much like that of the Out_2 setup in FIG. 8. Both outputs will use the same up_2_dn_2_2nd_HI HDL module to create the output port value. The only differences are the input and output port names, as well as the input comparison select lines used in the output equation. The appropriate port and select lines from the FIG. 21 and FIG. 8 arrays will be mapped into up_2_dn_2_2nd_HI HDL input and output ports, which will then produce the correct up_2_dn_2_2nd_HI function for each instance.

Inside the up_2_dn_2_2nd_HI module, represented by FIG. 2, the top select line simply divides the module operation into the operation of 2 smaller modules. In FIG. 2, the 2 smaller modules are max_2 muxes, the same mux used to produce the overall max output port, such as Out_7 in the UP-4/DN-4 merge.

FIG. 22 illustrates the output port equations for the 4 highest UP-4/DN-4 outputs, and emphasizes how top select lines are used to divide an equation into 2 distinct smaller equations, each of which can be solved using an HDL module. The Out_7 equation is a simple 2-max equation. As mentioned just above, the top select line for the Out_6 equation divides the equation so that two 2-max modules are used to produce the signals for the top 2-to-1 mux.

For Out_5 in FIG. 22, the top select line divides the equation into 2 sections, each of which processes a distinct group of 3 inputs using 2 comparison result select lines. The up_2_dn_1_2nd_HI module is the same module used to produce the Out_2 and Out_1 output port values in FIG. 19. The up_1_dn_2_2nd_LO module is the same module that produces the FIG. 13 Out_2 and Out_1 output port values.

For Out_4 in FIG. 22, the top select line chooses between 2 signals, both of which are outputs of an up_2_dn_2_2nd_HI module, the same module illustrated above to produce Out_6. For all but the 2-max and 2-min modules, the top select line divides the module equation so that 2 smaller modules can be used to provide the inputs to the top 2-to-1 mux, the mux whose output directly drives the output port.

Single-Stage k-Way Merge: 3-Way 2/1/2 Example.

The embodiments described thus far have dealt with single-stage 2-way merge, in which 2 sorted input lists are merged into a single sorted output list. Principles presented earlier also pertain to single-stage merge processes in which more than 2 sorted input lists are merged into a single sorted output list.

An example of a k-way merge, with k>2, is a 3-way merge, with sorted input lists which have 2, 1, and 2 values in each list, respectively. An outputs-vs-inputs table for this 3-way merge is preferably constructed in the manner described earlier for a 2-way merge, with one adjustment. When marking a row for an input for a 2-way merge, the number of consecutive columns that are marked is the number of values in the other list, plus 1. For a k-way merge outputs-vs-inputs table, the number of consecutive columns that are marked is equal to the sum of all values in other lists, plus 1.

The example 3-way outputs-vs-inputs table is illustrated in FIG. 23. The inputs In_4 and In_3 in the first list are shown at the top of the table. The number of values in the other 2 lists equals 1+2=3, so the number of consecutive columns that are marked for In_4 and In_3 are 3+1=4. The middle list contains only In_2. The number of consecutive columns marked for it are 2+2+1=5, all 5 columns. The bottom list, like the top list, has 2 of the 5 total values. Like the top list, the number of consecutive columns that are marked is 2+1+1=4.

As discussed previously for a 2-way merge, the outputs-vs-inputs table can be used to create the all-sorted-output-lists table. This has been done for the example 3-way 2/1/2 merge, and the table for all of the sorted output lists is illustrated in FIG. 24. There are 8 cross list comparisons for this merge, and the comparison results are presented for each row in the FIG. 24 table.

The data from the FIG. 24 table can be used to develop equations for each output, as was done for the 2-way merge embodiments that were presented previously. For more than 2 lists, the equation development process may prove complex, so a designer may choose to break the overall merge into more than one stage. For example, in the first stage of a 4-way merge, pairs of lists can first be merged in parallel using single-stage 2-way merge processes. The 2 sorted output lists from this first stage can then be merged in one additional single stage, once again using the 2-way merge processes which have been presented in detail. This 2-stage process can still be used to produce a stable merge of the 4 input lists.

Embodiments of the present invention can be implemented in various hardware configurations and/or platforms, for example a sorter according to an embodiment of the present invention can be implemented via one or more of a field programmable gate array ("FPGA"), an application-specific integrated circuit ("ASIC"), an integrated circuit that is manufactured specifically for the purpose of implementing the sorting algorithm, a microcontroller, a microprocessor, a general or specific purpose computer operated by software which comprises instructions that implement the sorting algorithm, and/or a combination thereof. In one embodiment, a general-purpose computer is optionally not used.

The sorting algorithms of embodiments disclosed herein preferably take as input two pre-sorted input lists (also generally referred to as one-dimensional arrays) and merges the two lists into a single, ordered, output list. Although the text of this application and the figures illustrate embodiments where the data is presented in a particular orientation (i.e. a list that is a single row of data), and the steps in processing thus follows in a step-wise manner in the direction that the data is sorted, it is to be understood that the data can be input such that the rows become the columns or such that columns become the rows. Likewise, the data and processes can be reversed such that data which was at the beginning of an array can instead be located at the end of the array and thus processes which are illustrated or otherwise described as happening from the beginning of the list to the end of the list can instead proceed from the end of the array to the beginning of the array.

Although single-stage merge sorting networks are targeted to be used in hardware, they can also optionally be used in software applications where data-oblivious sorting and merging are desired.

Some embodiments of the present invention also relate to stable single-stage 2-way hardware merge sorters, and systematic methods used to design them wherein a 2-way merge comprises merging 2 sorted input lists into a single sorted output list, and wherein a single-stage device comprises one set of input ports, one set of output ports, and internal logic to map an input port value to its correct location in the sorted output list, and wherein in a stable merge, a value in the input list with the higher stable property will precede an equal value in the other list when mapped into the single sorted output list. The two input lists can optionally be referred to as an UP list, which has the higher stable property, and a DN list, which has the lower stable property. Accordingly, the number of values in the UP list can be called N_UP, and the number of values in the DN list can be called N_DN, and the number of total values in the sorted output list is therefore N_OUT=N_UP+N_DN, and the number of comparisons needed to map each input into the fully sorted output list is N_COMP=N_UP*N_DN, and each comparison result indicates whether an UP input is greater than or equal to a DN input, and the design of each output port is independent of the design of other output ports, and the number of UP possible inputs that can go to an output port can be referred to as (N_POSS_UP), and the number of DN possible inputs that can go to an output port can be referred to as (N_POSS_DN), and therefore the total number of possible inputs for that output port is N_POSSIBLE=N_POSS_UP+N_POSS_DN, and (N_POSSIBLE−1) comparison result select lines can be used to determine which of the inputs is mapped to the output port.

The initial design methodology can include determining all sorted output lists constructed from the 2 sorted input lists, and placing each unique output list, in sorted order, into a table row, and filling in the N_COMP comparison result columns in that row, based on the sorted order of the inputs in the row output list, and three summation rows are preferably added at the bottom of the table in which the output column values in the row indicate the number of possible UP inputs for this output, the number of possible DN inputs for this output, and the N_POSSIBLE total number of possible inputs for this output, and after the table is complete, for each output port, determine which group of N_POSSIBLE inputs can go to that output, and determine the group of (N_POSSIBLE−1) comparison results which will map the correct possible input to that output, and determine a top select line for that output, a comparison result signal which divides the possible inputs into 2 distinct equal-or-one-less input subgroups.

Each output port equation can be a combination of conditional operations, wherein each conditional operation is modeled in hardware in a 2-to-1 mux, with the mux select line being one of the (N_POSSIBLE−1) comparison results for the given output, and wherein each mux select line divides a group of distinct inputs into 2 distinct equal-or-one-less input subgroups. An outputs-vs-inputs table can be created, in which the column headers are the output port names, sorted from the max output port on the left, to the min output port on the right, and where the row names are the names of the UP and DN inputs, with the max UP input identifying the top row, and with each lower UP input identifying the row name of next row down, and after the row identified by the lowest UP input, the next row down identifying the top DN input, with each lower DN input the row name of next row down, with the last, bottom row identified by the lowest DN input, and where the topmost row, identifying the max UP input, N_DN+1 consecutive columns are marked, starting with the leftmost column, and for any remaining UP input rows, move one column to the right, and mark N_DN+1 consecutive columns, and in the row identifying the max DN input, N_UP+1 consecutive columns are marked, starting with the leftmost column, and for any remaining DN input rows, move one column to the right, and mark N_UP+1 consecutive columns.

Of course, in any embodiments, if a table is used, it is not essential to have the data arranged and processed as specifically described herein (i.e. the rows can instead be columns and the data can thus be processed from up to down or down to up. In addition, if the data are arranged in rows, they can be from right to left and the process can thus the left to right processing can be reversed).

Optionally, an outputs-vs-select_lines table can be created, in which the column headers are the output port names, sorted from the max output port on the left, to the min output port on the right, and where the row names are the names of the N_COMP comparison result select lines, sorted first the comparison UP input, then by the comparison DN input, with the top row name identifying the comparison result between the max UP input and max DN input, and the bottom row name identifying the comparison result between the min UP input and min DN input, and in the leftmost column, in which the comparison result identified is between the max UP input and max DN input, a single mark is placed in the top row, after which an additional mark is placed one column to the right in the top row, and in the next column to the right, if there any select lines that identify the comparison between the max UP input and the DN input that is one less than the max DN input, mark this select line row and column, and mark the column just to the right in this same row, with this marking process called a Decrement_DN_input step, and also in this same column, if there any select lines that identify the comparison between the UP input one less than the max UP input, and the max DN input, mark this select line row and column, and mark the column just to the right in this same row, with this marking process called a Decrement_UP_input step, and for each additional column to the right, move to that column, and if there any UP inputs which are lower than the lowest UP input identified in the column to the left, mark the select line row identified by UP input that is one less than the lowest UP input in the column to left, and the max DN input, and also mark the column to the right in the select line same row, with this marking process a Decrement_UP_input step, and in this same column, for each UP input identified in a select line in the column to the left, if the lowest identified select line DN input for this UP is greater than the min DN input, mark the select line row in this column with this UP input and the DN input that is one less the min DN input in the column to the left, and mark the column just to the right in this same select line row, with this marking process being a Decrement_DN_input step.

In one embodiment, the output ports are also placed into a 2-row 2-D array, with the highest N_UP outputs placed into the UP row 1, and the lowest N_DN outputs placed into the DN row 0, and if N_UP<N_DN, the UP outputs are right aligned to the DN outputs, and if N_DN<N_UP, the DN outputs are left aligned to the UP outputs, and for each UP output, the possible inputs for this output are in sorted UP or DN order, left aligned to the output port column, and for each DN output, the possible inputs for this output are in sorted UP or DN order, right aligned to the output port column, and if N_POSS_UP is odd, the middle column in the UP inputs will determine the top select line for this output, or if N_POSS_DN is odd, the middle column in the DN inputs will determine the top select line for this output, or N_POSS_UP and N_POSS_DN are equal and even, and a midline separates the left possible inputs from the right possible inputs, and for an UP output, the column to the left of the midline will determine the top select line for this output, or for a DN output, the column to the right of the midline will determine the top select line for this output, and once the top select line column is identified, the top select line for this output is the comparison result when the column UP input is compared to see if it is >=the column DN input.

The preceding examples can be repeated with similar success by substituting the generically or specifically described components and/or operating conditions of embodiments of the present invention for those used in the preceding examples.

The terms, "a", "an", "the", and "said" mean "one or more" unless context explicitly dictates otherwise. Note that in the specification and claims, "about", "approximately", and/or "substantially" means within twenty percent (20%) of the amount, value, or condition given.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. A method for creating a stable single stage merging device, which merges numeric values of at least two pre-sorted input lists into a single sorted output list of the numeric values, the method comprising:
   establishing a ranking for the at least two pre-sorted input lists based on a position for each of the at least two pre-sorted input lists in a stable sort hierarchy, such that an equal value from a higher ranked input list of the at least two pre-sorted input lists always precedes an equal value from a lower ranked list of the at least two pre-sorted input lists in the single sorted output list;
   establishing a number of input ports of the stable single stage merging device equal to a sum total of a number of input values of the at least two pre-sorted input lists;
   establishing a number of output ports of the stable single stage merging device equal to the sum total of the number of input values of the at least two pre-sorted input lists;
   determining a set of cross-list comparisons in which each value in a higher-ranked list is compared by the stable single stage merging device to each value in each lower-ranked list using a Boolean comparison operation for greater-than-or-equal-to, such that a true comparison result indicates that a value from the higher ranked list is greater-than-or-equal-to a value from the lower ranked list;
   for each respective output port of the stable single stage merging device, determining a set of input ports of the stable single stage merging device that can map to that respective output port;
   for each respective output port of the stable single stage merging device, determining a set of comparisons that select a correct input port of the stable single stage merging device to map to that respective output port;
   determining all possible sorted output combinations of the input ports of the at least two pre-sorted input lists;
   for each respective output port of the stable single stage merging device, creating a conditional equation which uses the port's set of comparisons in order to map each of the output port's possible input values to that respective output port;
   for each respective output port of the stable single stage merging device, implementing a conditional equation which uses the port's set of comparisons acting as select lines for 2-to-1 multiplexers of the stable single stage merging device which map each of the output port's possible input values to that respective output port; and
   creating the stable single stage merging device in target hardware.

2. The method of claim 1 wherein the stable single-stage merging device is created in a semiconductor.

3. The method of claim 1 further comprising building a table that illustrates which input ports can map to which output ports.

4. The method of claim 1 wherein for each respective output port, the determined set of comparisons number one less than the set of input ports that was determined as being able to map to that respective output port.

5. The method of claim 1 wherein creating the stable single stage merging device in target hardware comprises creating the stable single stage merging device in target hardware such that the 2-to-1 multiplexers are configured to pass an input value to their output based on states of the respective output port's set of comparisons.

6. The method of claim 1 wherein the established ranking of the at least two pre-sorted input lists is based on order of stability.

7. The method of claim 2 further comprising creating the stable single stage merging device in the semiconductor to have parallel hardware architecture.

8. The method of claim 2 further comprising creating the stable single stage merging device in the semiconductor such that it performs the merge sort in a single parallel stage process and does not perform the process as a series of discrete iterative steps.

9. The method of claim 1 wherein the input values of each of the at least two pre-sorted input lists are presorted in numerical order.

10. The method of claim 1 wherein the input values of each of the at least two pre-sorted input lists are presorted in reverse numerical order.

11. The method of claim 1 wherein determining a set of comparisons that select a correct input port comprises determining comparisons that need not be performed.

12. The method of claim 1 wherein the at least two presorted input lists comprises two pre-sorted input lists.

13. The method of claim 1 wherein the at least two presorted input lists comprises more than two pre-sorted input lists.

14. A method for performing a stable single-stage merge sort comprising inputting at least two pre-sorted input lists into the semiconductor of claim 2 and activating the semiconductor.

15. The method of claim 14 wherein inputting at least two presorted input lists into the semiconductor comprises inputting at least two presorted input lists into a field programmable gate array.

16. A method for creating a stable single stage merging device, which merges numeric values of at least two pre-sorted input lists into a single sorted output list of the numeric values, the method comprising:
   establishing a ranking for the at least two pre-sorted input lists based on a position for each of the at least two pre-sorted input lists in a stable sort hierarchy, such that an equal value from a higher ranked input list of the at least two pre-sorted input lists always precedes an equal value from a lower ranked list of the at least two pre-sorted input lists in the single sorted output list;
   establishing a number of input ports of the stable single stage merging device equal to a sum total of a number of input values of the at least two pre-sorted input lists;
   establishing a number of output ports of the stable single stage merging device equal to the sum total of the number of input values of the at least two pre-sorted input lists;

determining a set of cross-list comparisons in which each value in a lower-ranked list is compared by the stable single stage merging device to each value in each higher-ranked list using a Boolean comparison operation, wherein a comparison result indicates that a value from the higher ranked list is greater-than-or-equal-to a value from the lower ranked list;

for each respective output port of the stable single stage merging device, determining a set of input ports of the stable single stage merging device that can map to that respective output port;

for each respective output port of the stable single stage merging device, determining a set of comparisons that select a correct input port of the stable single stage merging device to map to that respective output port;

determining all possible sorted output combinations of the input ports of the at least two pre-sorted input lists;

for each respective output port of the stable single stage merging device, creating a conditional equation which uses the port's set of comparisons in order to map each of the output port's possible input values to that respective output port;

for each respective output port of the stable single stage merging device, implementing a conditional equation which uses the port's set of comparisons acting as select lines for 2-to-1 multiplexers of the stable single stage merging device which map each of the output port's possible input values to that respective output port; and creating the stable single stage merging device in target hardware.

17. The method of claim 16 wherein the stable single-stage merging device is created in a semiconductor.

18. The method of claim 2 further comprising programming a semiconductor.

19. The method of claim 17 further comprising programming a semiconductor.

\* \* \* \* \*